(12) United States Patent
Gunther et al.

(10) Patent No.: US 8,954,767 B2
(45) Date of Patent: Feb. 10, 2015

(54) STANDBY CURRENT REDUCTION THROUGH A SWITCHING ARRANGEMENT WITH MULTIPLE REGULATORS

(71) Applicant: NXP B.V., Eindhoven (NL)

(72) Inventors: Andre Gunther, San Jose, CA (US); Kevin Mahooti, Sunnyvale, CA (US); Meng Hao, Shanghai (CN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/888,099

(22) Filed: May 6, 2013

(65) Prior Publication Data

US 2014/0149764 A1    May 29, 2014

Related U.S. Application Data

(63) Continuation of application No. 13/016,823, filed on Jan. 28, 2011, now abandoned.

(51) Int. Cl.
  *G06F 1/00*    (2006.01)
  *G06F 1/32*    (2006.01)
  *G05F 1/56*    (2006.01)
  *H02M 3/156*   (2006.01)

(52) U.S. Cl.
  CPC .............. *G06F 1/3203* (2013.01); *G05F 1/56* (2013.01); *H02M 3/156* (2013.01)
  USPC .......................................... 713/300; 323/351

(58) Field of Classification Search
  USPC .................................. 713/300–340; 323/351
  See application file for complete search history.

(56) References Cited

U.S. PATENT DOCUMENTS 7,609,047 B2 * 10/2009 Ravichandran ............... 323/351
8,112,642 B2 *  2/2012 Bose et al. .................... 713/300

* cited by examiner

*Primary Examiner* — Faisal M Zaman
*Assistant Examiner* — Kim Huynh (57) ABSTRACT

Consistent with an example embodiment, there is a power regulator arrangement with variable current capacity providing power from a power supply to a load having variable demand. As a load, a high-performance microprocessor has several modes of operation. At the highest speed setting, it demands a lot of current. At slower clock speeds and during state retention, the processor has a very low current consumption. Using a single regulator, the current efficiency may be very low during long standby periods. To increase the efficiency even at lower load currents, a scheme is based on parallel operation of multiple regulators having different load ranges, for example, a "low, "medium," and "high" range regulators. Having knowledge of the load current profile, the regulators can be adjusted such that the peak of the efficiency curve matches the load profile of the regulator. The efficiency of the power regulator arrangement is enhanced throughout the range of power demanded by the load.

10 Claims, 11 Drawing Sheets

STANDBY CURRENT REDUCTION THROUGH A SWITCHING ARRANGEMENT WITH MULTIPLE REGULATORS

This application is a Continuation of U.S. application Ser. No. 13/016,823 filed on Jan. 28, 2011 entitled "Standby Current Reduction through A Switching Arrangement with Multiple Regulators."

One or more embodiments relate to voltage regulators.

Power consumption may be pose a significant design issue for a myriad of devices in use in the modern home or workplace. A significant amount of power may be consumed even when devices are supposedly "off" In this "off" state many modern devices are in a standby mode. According to the Energy Analysis Department, Environmental Energy Technologies Division of Lawrence Berkeley National Laboratory, although nobody knows for sure, standby power typically is 5-10% of residential electricity use in most developed countries. Those ubiquitous external power supplies—the little black cubes—which have two teeth (the plugs)—that suck electricity all night are often referred to as "energy vampires." Appliances which are supposedly switched off, consuming power maintaining programming settings or clock displays, contribute to the standby load.

Many varieties of semiconductor devices have been manufactured having various applications in numerous disciplines, all consuming varying amounts of energy during their operation or when idle. Of particular concern are microprocessors. An important device is a power supply regulator. Maintaining a reliable stable power supply is particularly important for microprocessor circuits.

Modern microprocessor circuits are very demanding on the power supply regulators. At the highest speed of operation, microprocessors draw large amounts of current, necessitating a power supply regulator with large current capability. At the other end of the spectrum, sophisticated power savings and idle modes consume only leakage currents in the nano-ampere range.

Figure 1:
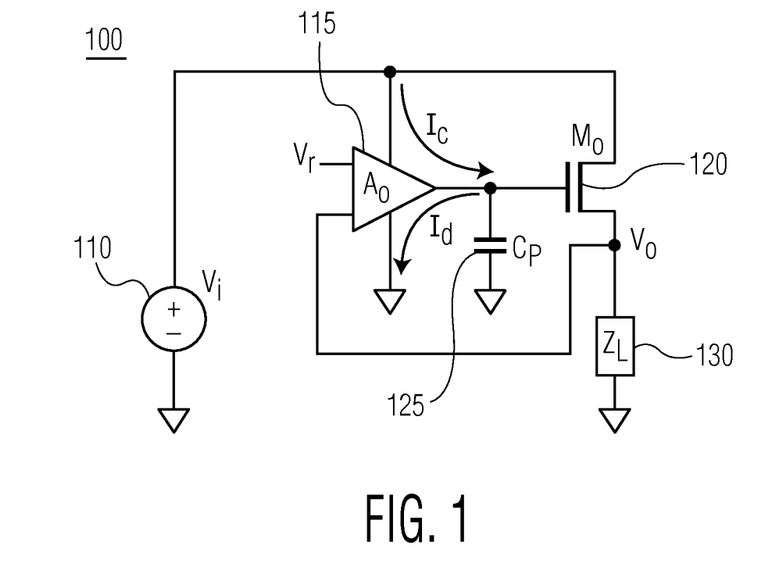
FIG. 1 is a circuit diagram of an example regulator.

Refer to FIG. 1. In an example linear regulator 100, the linear regulator consists of an error amplifier/driver ($A_O$) 115 that controls a pass device ($M_O$) 120. The error amplifier/driver 115 adjusts the gate voltage of the pass device depending on a feedback voltage and a reference voltage ($V_r$), thus regulating the output Voltage ($V_O$) within a specified range. The feedback voltage could be a fraction of the output voltage or equal to the output voltage as shown in FIG. 1. The large maximum load current requirements 130 of the microprocessor thus require a large pass device $M_O$. This in turn results in a large parasitic capacitance ($C_P$) 125.

To charge the capacitor voltage at a rate of $\partial V/\partial t$ at a charging current of $I_C = C \cdot \partial V / \partial t$ is necessary. Similarly, discharging the capacitor at a rate of $-\partial V/\partial t$ requires a discharging current of $I_d = C \cdot \partial V / \partial t$.

The gate driver thus provides large charging and discharging currents to the parasitic capacitance of the pass device. Larger current driving capability also dictates larger bias currents and hence an increased current consumption of the regulator.

To maintain the same speed performance with the same architecture, a regulator circuit may consume a standby current that grows with the maximum specified load current.

Figure 2:
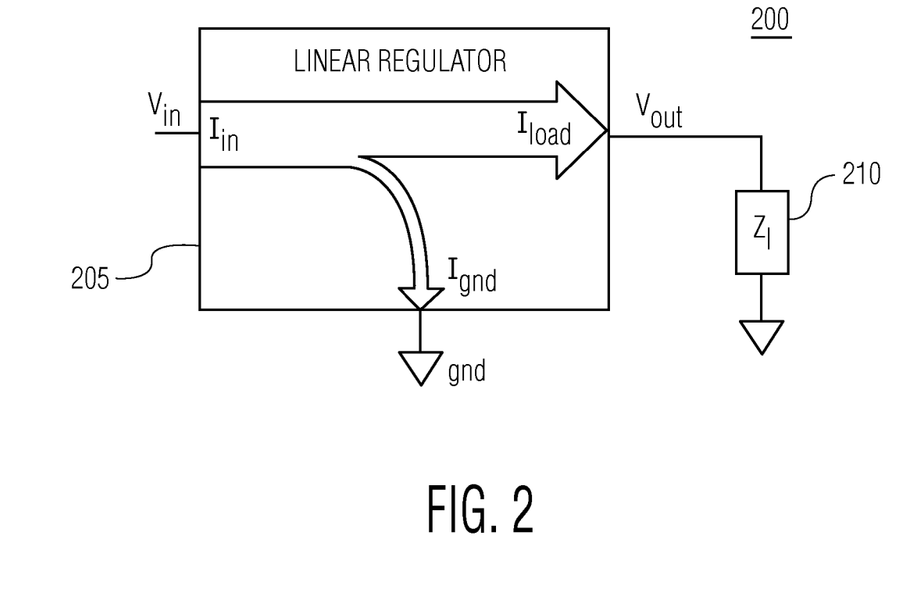
FIG. 2. is a flow diagram outlining an example linear regulator's current efficiency.

The user may specify the current efficiency of a linear regulator as $\eta_I = I_{load}/I_{in} = I_{load}/I_{load} + I_{gnd}$. FIG. 2 depicts a flow diagram of a linear regulator showing the relationship between the input current $I_{in}$, the load current $I_{load}$, and the ground current $I_{gnd}$.

Figure 3:
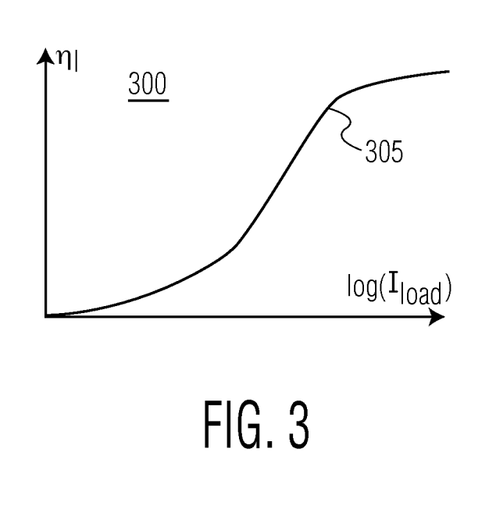
FIG. 3 is a plot of Current Efficiency of a Linear Regulator v. Load Current.

Assuming a constant ground current (bias) of the regulator, the efficiency versus load current curve for a linear regulator will look like the curve depicted in FIG. 3. As curve 305 shows, at high load currents, the regulator current efficiency is very high, but at low load currents, the regulator efficiency is very poor.

For example, modern high performance microprocessors have several modes of operation. When operated at the highest speed setting, a large amount of current may be required by a processor. When operated at a slower clock speed and during state retention these processors have a very low current consumption.

With a conventional single regulator, the current efficiency would be very low during long standby periods. The standby period is a mode in which an electronic system or component spends time in a sleep, power down, state retention, etc. in contrast to its active state. The power consumption in those standby modes can be significant to the overall power requirements of an electronic system.

There is a need for a scheme for maximizing power supply regulator efficiency so as to minimize standby power and yet, provide sufficient power on-demand as required by modern electronic systems.

One or more embodiments may increase efficiency of the power supplies for loads with variable load and current requirements. As the load increases, one or more regulators are put on line to meet the demand; The maximum drive current of the regulators is matched closely to the load to keep the system working at peak current efficiency. Likewise, as the load decreases, the number of regulators dropped off line also closely matches the load, maintaining the efficiency. In a standby mode, a minimum number of regulators is maintained online so that the system may respond appropriately to changes in demand.

In an example embodiment, a power regulator circuit is configured to provide variable current capacity for providing power (VDD) from a power supply to a load having variable demand. The power regulator arrangement comprises, a first voltage regulator including input for power from the power supply (Vin), a power-activation input, a power output supplying power to the load, and a power output-level status; an additional voltage regulator including input for power from the power supply (Vin), a power-activation input, a power output supplying power to the load, and a power output level status. A power management control unit (PMCU) has a demand monitor input coupled to the current demand output of the load, and a capacity status output of the PMCU is coupled to the current-capacity input on the load; the PMCU has control outputs coupled to each of the respective voltage regulator power-activation and status monitor connections coupled to each of the respective voltage regulator power output level status. In response to the current demand of the load, the PMCU is configured to send control signals to cause one of more of the voltage regulators to power up commensurate with the current demand of the load.

In another example embodiment, a power regulator is adapted to provide variable current capacity for providing power (VDD) from a power supply to a load having variable demand. The power regulator comprises, a first voltage regulator, including input for power from the power supply (Vin), a power-activation input, a power output supplying power to the load, and a power output level-status; a second voltage regulator of a second load capacity lower than that of the first, including input for power from the power supply (Vin), a power-activation input, a power output supplying power to the load, and a power output level-status; and a third voltage regulator, including input for power from the power supply (Vin), a power-activation input, a power output supplying power to the load, and a power output level-status. There is a power management control unit (PMCU) having a demand monitor input coupled to the current demand output of the load, and a capacity status output of the PMCU coupled to the current-capacity input on the load, the PMCU having control outputs coupled to each of the respective voltage regulator power-activation inputs and status monitor connections coupled to each of the respective voltage regulator power output level status. In response to the current demand of the load, the PMCU is configured to send control signals to cause the one or more voltage regulators to power up commensurate with the current demand of the load.

In yet another embodiment, a power regulator arrangement has variable current capacity providing power to a plurality of voltage domains each having variable demand. The power regulator comprises a main regulator block having one main regulator supplying a first voltage and an additional main regulator supplying an additional voltage; there is a low-power regulator block having one low power regulator supplying the first voltage and an additional low-power regulator supplying the additional voltage; a standby regulator block having one ultra-low power regulator supplies the first voltage and an additional ultra-low power regulator supplies the additional voltage. A power management control unit (PMCU) has voltage supply inputs coupled to coupled to the first voltage and to the additional voltage, thereby providing power to the PMCU, regulator status inputs configured to receive output voltage status signals from each of the regulator blocks, regulator power control outputs configured to transmit power-activation signals to each of the regulator blocks in response to the variable demand of the plurality of voltage domains, and level shift control outputs. There is voltage island operating at the first voltage and an additional voltage island operating at an additional voltage, wherein the voltage island and the additional voltage island each are coupled to a first level shifter and to an additional level shifter. The first level shifter and the additional level shifter facilitating data flow between the first voltage island and the additional voltage island, wherein the facilitating of the data flow is initiated by control inputs at each level shifter receiving information from the level shift control outputs of the PMCU In another embodiment, there is a method for increasing the efficiency of a power regulator driving a microprocessor. A power regulator arrangement with variable current capacity providing power (VDD) from a power supply to a load having variable demand is provided. The power regulator arrangement includes a first voltage regulator of a first load capacity, including input for power from the power supply (Vin), a power activation input, a power output supplying power to the load, and a power output level status monitor; an additional voltage regulator of a another load capacity lower than that of the first, including input for power from the power supply (Vin), a power activation input, a power output supplying power to the load, and a power output level status monitor; and a power management control unit (PMCU) having a demand monitor input coupled to the current demand output of the load, and a capacity status output of the PMCU coupled to the current-capacity input on the load, the PMCU having control outputs coupled to each of the respective voltage regulator power-activation inputs and status monitor connections coupled to each of the respective voltage regulator power output-level status. The power demand of the microprocessor is measured. The PMCU responds to the microprocessor current demand by sending control signals to the power activation input of each of the voltage regulators. According to the current requirements of the microprocessor, one or more voltage regulators is powered up.

The embodiments described above are not intended to represent all disclosed embodiments or aspects. Other aspects and example embodiments are provided in the figures and the detailed description that follow.

The embodiments may be more completely understood in consideration of the following detailed description and accompanying drawings, in which.

While the embodiments are amenable to various modifications and alternative forms, specifics thereof have been shown by way of example in the drawings and will be described in detail. It should be understood, however, that the intention is not to limit the embodiments to the described implementations. On the contrary, the intention is to cover all modifications, equivalents, and alternatives falling within the spirit and scope of the embodiments as defined by the appended claims.

One of more embodiments provide a method and circuit to increase efficiency of voltage regulators during periods of low current draw. A system based on parallel operation of multiple regulators permits the power management unit to operate efficiently at varying loads.

In a first example embodiment, a power regulator arrangement is used and configured to provide variable current capacity for providing power (VDD) from a power supply to a load having variable demand. The power regulator includes a first voltage regulator including an input for power from the power supply (Vin), a power-activation input, a power output coupled to supply power to a load, and a power output-level-status monitor. The regulator further includes an additional voltage regulator with input for power from the power supply (Vin), a power-activation input, a power output coupled to supply power to the load, and a power output level-status monitor, and a power management control unit (PMCU). The PMCU has a demand monitor input coupled to the current demand output of the load, and a capacity status output of the PMCU coupled to the current-capacity input on the load. The PMCU has control outputs coupled to each of the respective voltage regulator inputs and status monitor connections coupled to each of the respective voltage regulator power outputs. The control outputs and the voltage regulator power outputs are used to provide efficient use of power. For example, in one such configuration consistent therewith, in response to the current demand of the load, the PMCU is adapted to send control signals to cause one or more of the voltage regulators to enable or disable up one or more regulator circuits according to current required by the load.

Figure 4:
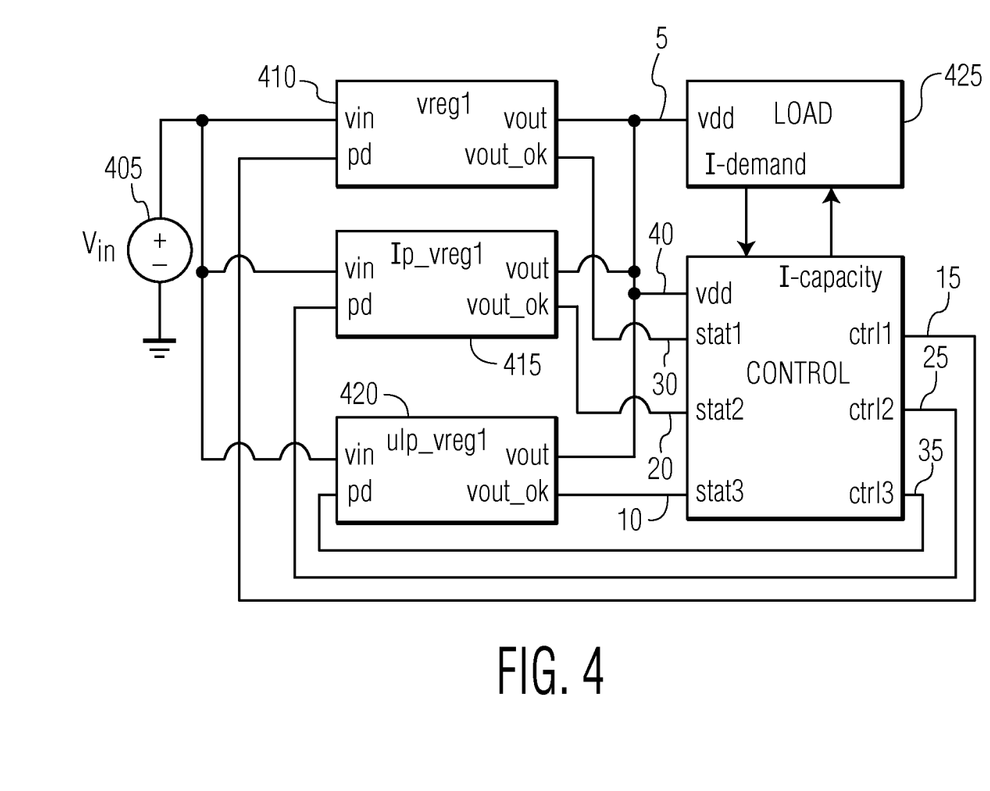
FIG. 4 is a schematic of a parallel regulator.

In one or more embodiments, an arrangement encompassing three regulators, from an increased efficiency and lower cost standpoint, provides a range of currents required by microprocessors and similar devices. FIG. 4 depicts a parallel regulator scheme 400.

Input power is supplied from a voltage source 405 ($V_{in}$). The main regulator 410 (vreg1) supplies power to the load (i.e., such a microprocessor) 425 and is able to handle the maximum current the load 425 needs. The low power regulator 415 (lp_vreg1) is configured to exhibit lower power consumption, but is not required to handle the full current of the load 425. The ultra low power regulator 420 (ulp_vreg1) is configured to exhibit ultra low power consumption and generate current required by the microprocessor (425) when operating in a standby mode.

Load power is received via the vdd input, the load signals its power needs through an I-demand interface coupled to a control 430. The control 430 tells the load 425 whether via an I-capacity interface, the needed power can be delivered. In another example embodiment, there may be a number of interface connections to couple and monitor the current demand of the load in addition to those illustrated in FIG. 4.

Each of the three regulators has inputs for input power (vin), for receiving a power down signal (pd); outputs vout to the vdd input 5 of the load 425 and power management control unit (PMCU) 430. The PMCU has inputs to monitor status of the power regulators, 410, 420, and 430 via stat1, stat2, and stat3, pins 20, 25, and 30, respectively; these pins receive a vout_ok status from each of the regulators 410, 415, and 420. The PMCU outputs control signals ctrl 1, ctrl, 2, and ctrl, 3, to the regulators, 420, 415, and 410, respectively.

In one example implementation, the low power regulator 415 (lp_vreg1) is always enabled when the main regulator 410 (vreg1) is enabled to improve switchover speed. The ultra low power regulator 420 (ulp_vreg1) is always enabled when the low power regulator 415 (lp_vreg1) is enabled. The additional current consumption is minimal, since each regulator consumes only a tiny fraction of the current of the next larger regulator.

When the microprocessor 425 enters a lower power state, it reports a reduced current demand, through the I-demand pin 10 coupled to the Power Management Control Unit 430. The PMCU 430 can turn off the main regulator 410. The low power regulator 415 will then source the entire current the load 425 needs. A safety mechanism has to ensure that the load does not exceed the current this regulator can deliver by limiting the clock frequency and the number of peripherals that can be enabled. The control unit 430 will thus interface with the load and report the status, via the I-capacity pin 15, of the PMCU. In this manner, clock speed and power down modes of the microprocessor core and the peripherals can be actively managed to stay within the power budget at the reduced current mode and to prevent user error by turning off the high current regulator before the clock speeds and power down requirements are met.

In a similar manner, the low power regulator 415 (lp-vreg1) can be turned off and the ultra low power regulator can keep the supply voltage to retain state and enable almost immediate startup of the microprocessor. During this mode, only a very low frequency real time clock may be permitted.

Switching back to a higher power state requires the appropriate regulator stage to start up. The microprocessor 425 cannot immediately draw more current but must wait until the control logic indicates the readiness of the appropriate power mode, via the I-capacity interface. The microprocessor 425 tells the control unit 430 via the I-demand interface how much current is required.

In the example circuit, the control unit 430 sends signals ctrl 1, ctrl 2, and ctrl3 the respective pd interfaces of regulators 410, 415, and 420; the regulators 410, 415, and 420 respond be sending signals from their respective vout_ok interfaces to the control unit 430 stat1, stat2, and stat3 interfaces.

Each regulator is configured to indicate to the control unit 430 when it has started and is ready to deliver full current. The control unit 430 then signals to the microprocessor 425 the load capability of the power management system.

In one implementation, the control unit could be used to gate the clocks to the microprocessor directly or to enable and disable oscillators, PLLs, DLLs or clock dividers to ensure the load current restrictions are met.

In another embodiment, a handshake process may be used in conjunction with the demand monitor input. The microprocessor characteristics are well-studied, thus one can predict the current requirements in each mode of operation. The microprocessor will communicate with the Power Management Unit (PMU) that it is in or will go into a certain mode; the PMU automatically knows which power mode to enable to increase regulator efficiency in a given mode. In many applications, this handshaking protocol may be simpler to implement than the monitoring feature. Further, in the case of handshaking, with respect to the capacity status output, the microprocessor core will be signaled when it is safe to enter a mode that requires more power than a previous mode. In contrast, going to a lower power state does not require feedback and can happen with minimal delay.

Figure 5:
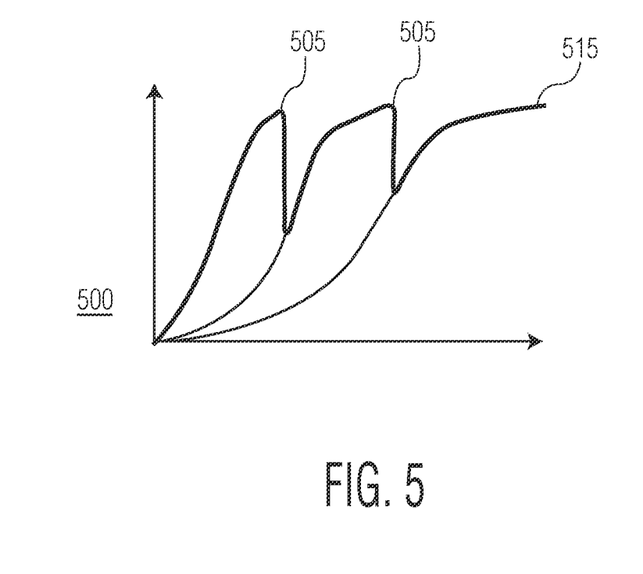
FIG. 5 is a plot of Current Efficiency Improvement by the use of the parallel regulators of FIG. 4.

Using three regulators, each particularly suited for different output currents, results in an improved efficiency at lower load currents. If the load current profile of the microprocessor is known, the regulators can be adjusted to match the peaks of the efficiency curve to the load profile of the regulator, thus maximizing efficiency throughout the entire operating region of the system. Refer to FIG. 5, The plot 500 of parallel regulators shows three curves 505, 510, and 515 at each regulator's efficiency peak (the ultra-low-power, the low-power, and main regulators). The dips in the curves 505 and 510 indicate the switching on of the higher power regulator and the lag of the attached load drawing additional power. Compared to the single regulator arrangement, the triple regulator combination is much more efficient at lower load currents.

Figure 6:
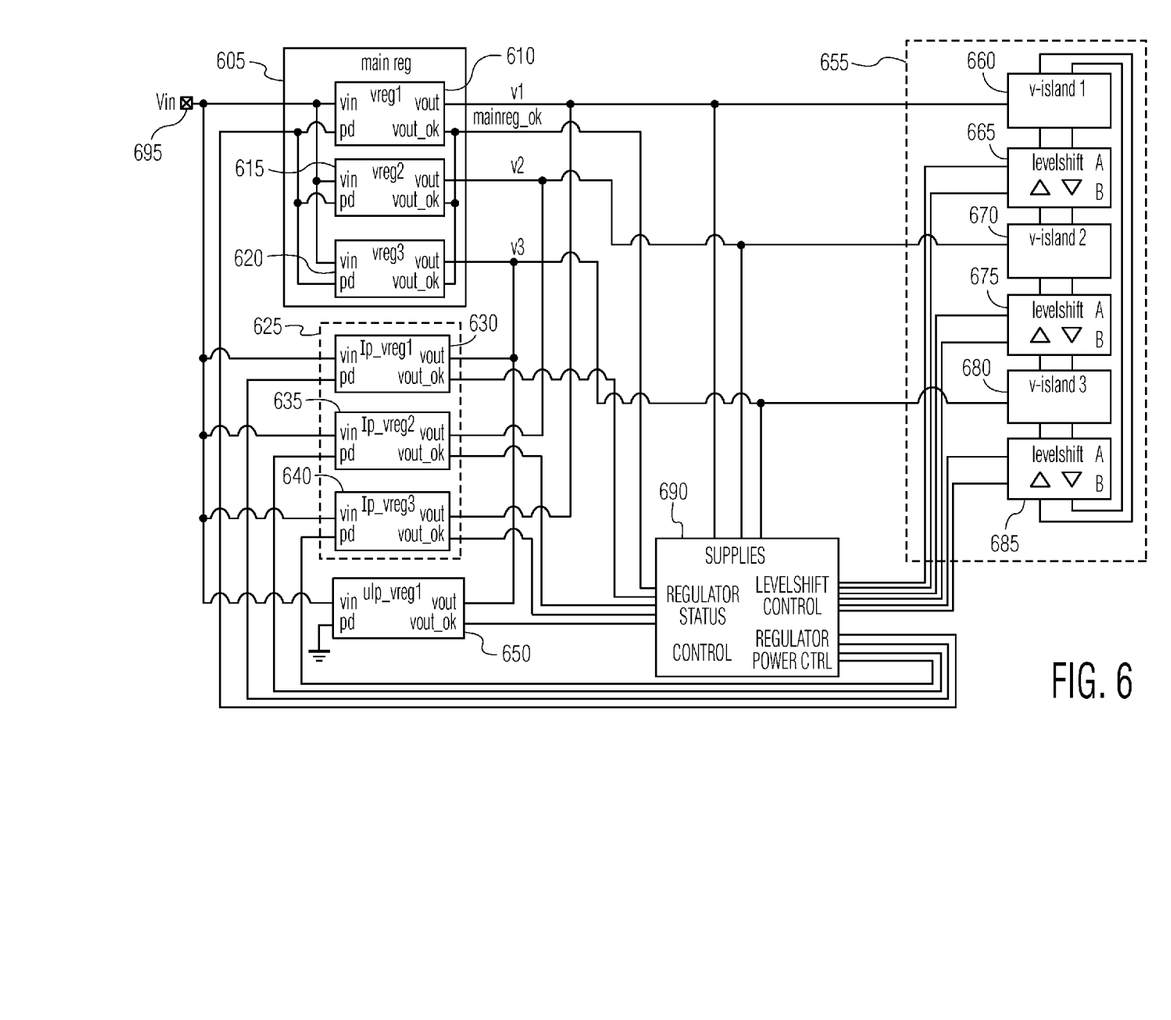
FIG. 6 is a schematic of a parallel regulator having multiple programmable output voltages.

Since the low current regulators are small compared to the main regulator, the added system cost is minimal. While the embodiments described in relation to FIGS. 4 and 5 are primarily described with reference to three regulators, the embodiments are thought to be applicable to arrangements having other numbers of regulators as well. In another embodiment, the parallel regulator arrangement may be used in multiple supply voltage designs, supporting multiple voltage islands. FIG. 6 depicts such a system with three separate voltage islands. Level shifters facilitate the data flow between the voltage islands.

The level shift control allows us to completely power down a voltage island and set the level shifters connecting from that voltage island to another voltage island to a predefined state. This ensures data integrity.

Common to each of the voltage regulators are $V_{in}$, pd, $V_{out}$, and $V_{out\_ok}$ pins. $V_{in}$ takes the voltage from the power source, pd receives commands from a control circuit to power-up or power-down the regulator, $V_{out}$ is the predefined output voltage of the regulator; $V_{out\_ok}$ provides a regulator status to indicate to the control circuit that $V_{out}$ is at the proper predefined voltage. In some applications, the pd pin may be grounded so as to keep the regulator powered-on at all times.

At the lowest power state, only one voltage domain (v-island 3) is remains active and is powered by the ultra low power regulator 650. System functions that still need to be operational in this mode need to be implemented in this voltage domain. This includes some of the power down mode controls in the control block itself.

Refer to FIG. 6. The parallel regulator arrangement similarly to th the parallel arrangement depicted in FIG. 4 has been configured into a main reg (605) having three separate voltage regulators vreg1 (610), vreg2 (615), and vreg3 (620); a low power regulator (625), having corresponding low power voltage regulators, lp_vreg1 (630), lp_vreg2 (635), and lp_vreg3 (640); for the ultra-low power range, ulp_vreg1 (645).

A voltage island and level shifter block 655 are coupled to the voltage regulator blocks 605, 625, and 645 through their vout terminals. The voltage islands v-island 1 (650), v-island 2 (655), and v-island 3 (660), are coupled to the three voltage levels v1, v2, and v3. Interfaced between each voltage island, are level shifters 665, 670, and 675.

A control block 690 monitors the output voltages of the regulators, monitors the regulator status, provides level shift control, and provides regulator power control.

Figure 7:
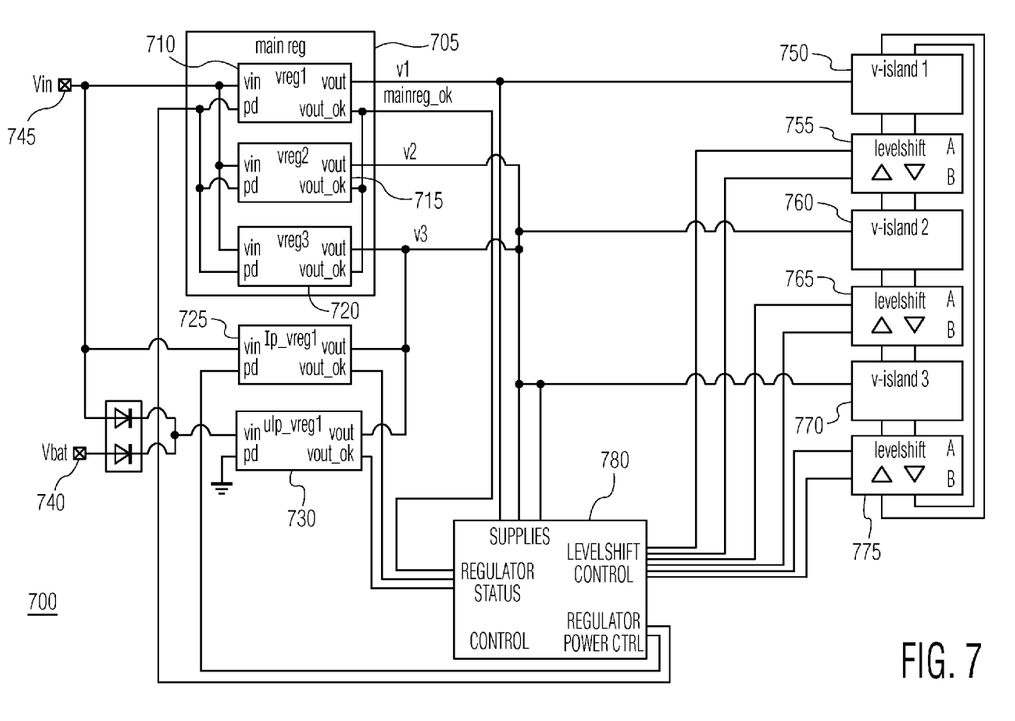
FIG. 7 is a schematic of a parallel regulator having multiple output voltages and dual input voltages including a backup battery.

In another embodiment, a multiple regulator arrangement is configured to receive input voltage from a power supply or a backup battery to provide multiple output voltages. Refer to FIG. 7. Circuit 700 includes two sources of power $V_{in}$ 745 and $V_{Bat}$ 740. Circuit 735 has blocking diodes to prevent backfeed into each of the sources from one another. Main regulator main_reg 705 has three voltage levels defined in vreg1 (710), vreg2 (715), and vreg3 (720) for $V_{out}$ at three voltages $V_1$, $V_2$, $V_3$, respectively. low power regulator, lp_vreg1 725 providing $V_3$ during a lighter load conditions, and ulp_vreg1 730 providing $V_3$ during standby conditions. Controller 780 verifies the regulator status (i.e., is the regulator powered-up and ready?, etc.), and controls the level shifters 765, 770, and 775 for signaling to and from devices operating in the three voltage islands, v-island 1 (750), v-island 2 (755), and v-island 3 (775). Controller 780 also monitors output voltages $V_1$, $V_2$, and $V_3$, and powers-up or powers-down the regulators in response to the demand.

The backup battery 740 provides power to the ulp_vreg1 730 for the voltage island, v-island 3 ($V_3$).

Connecting the outputs of regulators with push-pull output stages requires additional circuitry to balance the load current between the two circuits. Without load current balancing, one regulator will sink the full current the second regulator sources, thus creating a short circuit.

To combine regulators that can only source current one must ensure that they either share current according to their output drive capability (e.g. via their different respective output impedance) or that they can handle currents exceeding their nominal output currents. This usually requires proper metal interconnect width.

Figure 8A:
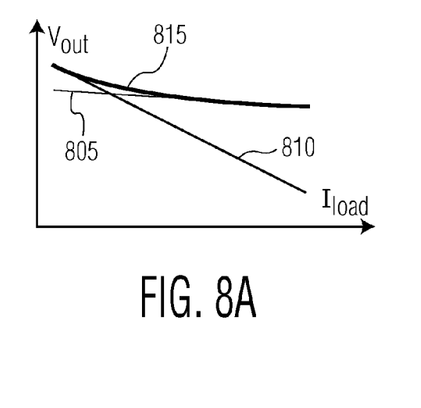
FIGS. 8A, 8B, and 8C are graphs depicting Output Voltage of a Parallel Combination of two regulators with three different output impedances.
Figure 8B:
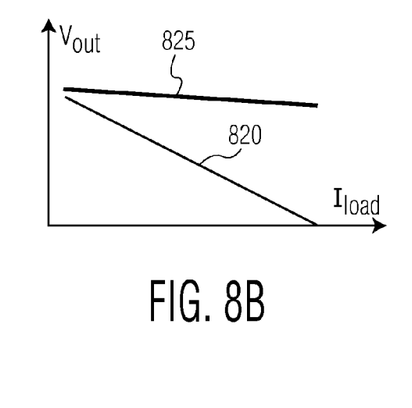
Figure 8C:
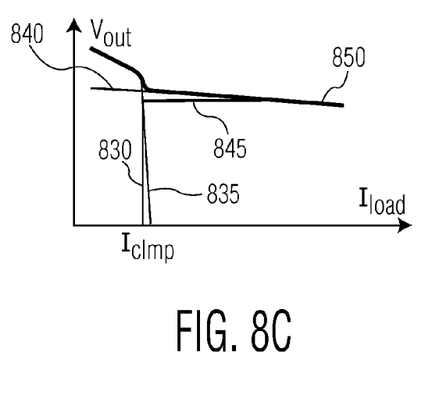

Low power regulators have higher output impedance than higher power regulators. FIGS. 8A-8C. depict the output voltage v. load current curves when regulators with different output impedance are connected to one another. The bold plots 815, 825, and 850 of FIGS. 8A, 8B, and 8C, respectively illustrate the resulting output of the parallel connection of the individual regulators (lighter curves).

FIG. 8A illustrates the operation of a high-impedance regulator (low power regulator), curve 810. The regulator exhibits a nominal output voltage at $I_{load}$=0 A that exceed the output voltage of the lower output impedance regulator (higher power regulator), curve 805. If the output voltage of the low power regulator (having high output impedance) is higher than that of the high power regulator, the output voltage will be slightly higher than that of the high power regulator at low currents and otherwise follow that of the high power regulator, as shown in curve 815.

FIG. 8B illustrates the operation of a high impedance regulator (low power regulator), curve 820 having a smaller nominal output voltage at $I_{load}$=0 A than that of the low impedance regulator (higher power regulator), curve not shown. If the output voltage of the high power regulator is larger, the output voltage will simply follow the curve of the high power regulator, curve 825.

FIG. 8C, illustrates the operation of a high power regulator (curve 840). In this example, the load current exceeds the maximum current of the low power regulator 835, the high power regulator 840 clamps the output voltage, and the low current regulator keeps delivering $I_{clmp}$ (830) to the load. The output voltage v. load curve 850 can have a step. If the output current of the low power regulator 830 has a hard limit, depending on the states of the microprocessor load, this step may manifest itself as noise on the power supply system, but it can easily be eliminated by disabling the output stage of the low power regulator (See FIG. 11) when the high power regulator indicates vout_ok to the control block (See FIG. 4).

In one implementation of the previously discussed embodiment, regulators with feed-forward output stages may be included. Feed-forward output stages do not employ a direct feedback, and are thus ideally suited for parallel connection.

In order to increase the output current, the gate source voltage ($V_{GS}$) of the output transistor needs to increase. Therefore, the output voltage will decrease, corresponding to the waveforms described in FIGS. 8A-8C.

Figure 9A:
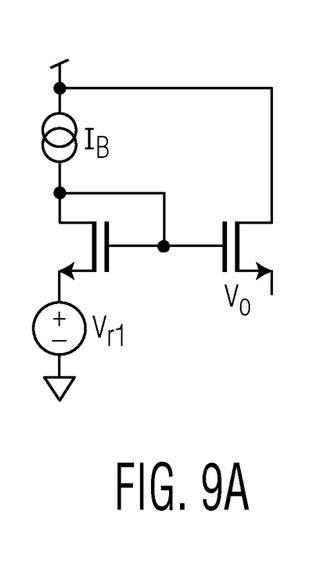
FIGS. 9A and 9B are schematics depicting two example regulator output stages with output impedance.
Figure 9B:
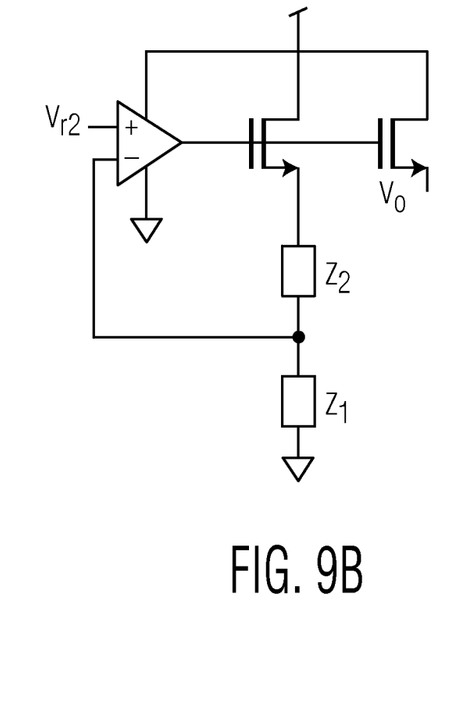

FIGS. 9A and 9B depict two example regulator output stages. In an example embodiment, the design of output stage FIG. 9A requires a minimum supply voltage of $V_{DD} > V_r + V_{GS} + V_{sat}$. The design of output stage FIG. 9B requires a minimum supply voltage of $V_{DD} > V_O + V_{GS}$ assuming a rail to rail output stage of the error amplifier.

Figure 10A:
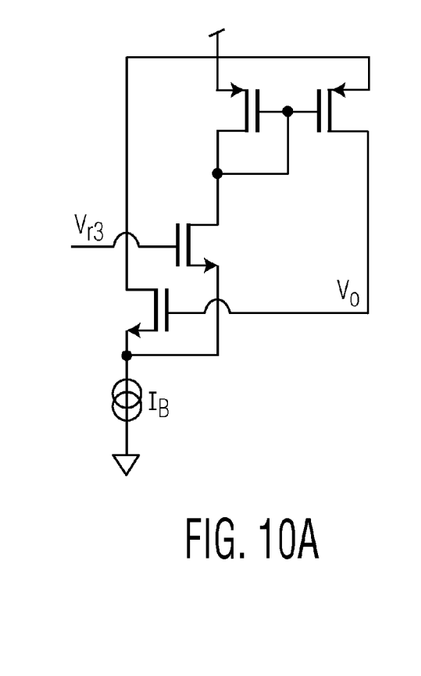
FIGS. 10A, 10B, and 10C are schematics depicting example output stages.
Figure 10B:
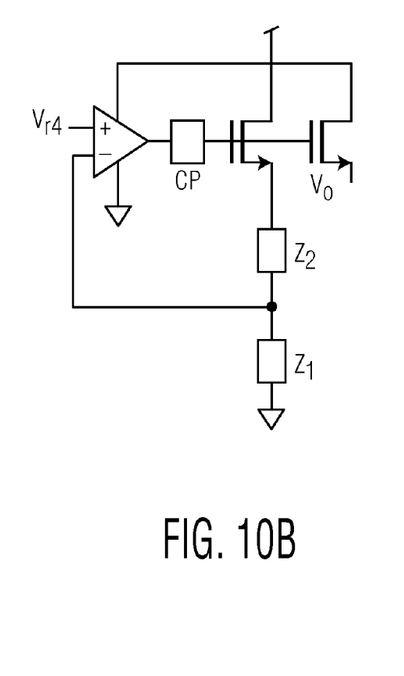
Figure 10C:
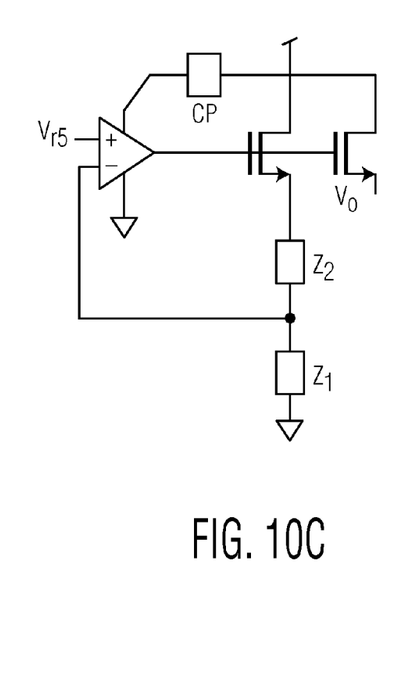

Refer to FIGS. 10A-10C. Only the "ON-resistance" of the pass device limits minimum supply voltage of the output stages of FIGS. 10A-10C. These regulators may be referred to as "Low Dropout Regulators," which means their minimum supply voltage is only determined by the device size of the pass transistor.

FIG. 10A has an output stage consisting of a trans-conductance amplifier with current sourcing capability. This type of output stage resembles an operational trans-conductance amplifier (OTA), whose defining feature is a high impedance output stage with current drive capability. These output stages are thus also ideally suited for parallel connection.

The output stage of FIG. 10B is similar to FIG. 9B with the addition of a Charge Pump (CP). The charge pump allows the supply voltage to fall below the required gate drive voltage, thus supporting low dropout operation. Either the charge pump can use the error amplifier input directly to produce an output voltage proportional to the error amplifier voltage or it can drive the error amplifier supply voltage as shown in FIG. 10C.

Figure 11A:
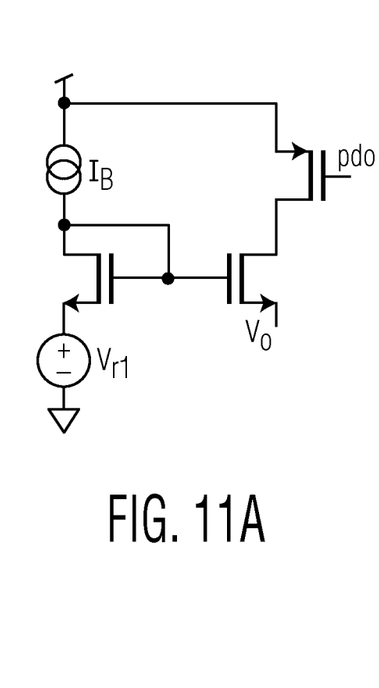
FIGS. 11A and 11B are schematics depicting low power regulator output stages.
Figure 11B:
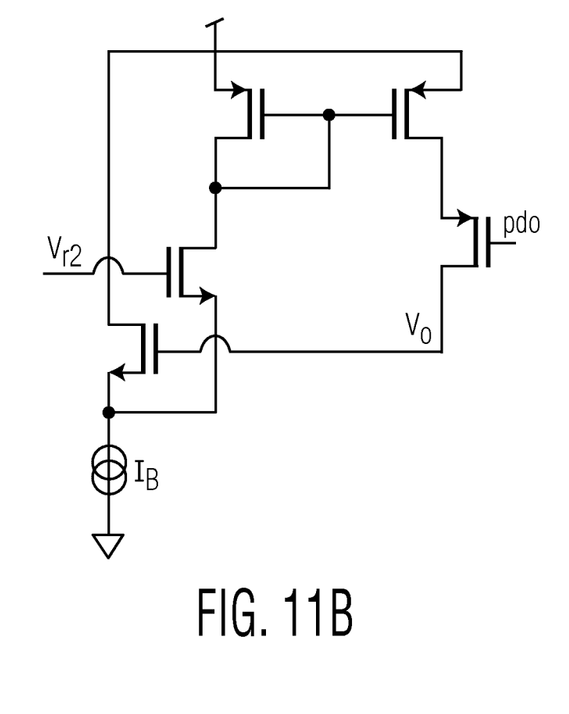

Refer to FIGS. 11A and 11B. These are low power regulator output stages with a power-down input providing control of the output transistor.

Numerous other embodiments will be apparent to persons skilled in the art without departing from the spirit and scope of the embodiments indicated in the appended claims.

The invention claimed is:

1. A power regulator configured to provide variable current capacity for providing power (VDD) from a power supply to a load having variable demand, the power regulator arrangement comprising:
   a first voltage regulator including input for power from the power supply (Vin), a power-activation input, a power output supplying power to the load, and a power output level status;
   a second voltage regulator including a power input (Vin) coupled to the power supply, a power-activation input, a power output supplying power to the load, and a power output level status; and
   a power management control unit (PMCU) configured to, in response to the current demand of the load, send control signals to enable or disable one of more of the voltage regulators;
   wherein the load consists of a microprocessor; and
   wherein a load profile of the microprocessor is known and has a first operating state and additional operating states, and the first voltage regulator and second voltage regulator are selected to operate at a maximum efficiency at the first operating state and additional operating states of the microprocessor.

2. The power regulator as recited in claim 1, wherein the PMCU has a demand monitor input coupled to the current demand output of the load, a capacity status output of the PMCU coupled to the current-capacity input on the load, control outputs coupled to each of the respective voltage regulator power-activation, and status monitor connections coupled to each of the respective voltage regulator power output level status.

3. The power regulator as recited in claim 1, wherein the first operating state requires less current than the additional operating states.

4. A power regulator adapted to provide variable current capacity for providing power (VDD) from a power supply to a load having variable demand, the power regulator comprising:
   a first voltage regulator, including input for power from the power supply (Vin), a power-activation input, a power output supplying power to the load, and a power output level status;
   a second voltage regulator of a second load capacity lower than that of the first, including input for power from the power supply (Vin), a power-activation input, a power output supplying power to the load, and a power output level-status;
   a third voltage regulator, including input for power from the power supply (Vin), a power-activation input, a power output supplying power to the load, and a power output level status; and
   a power management control unit (PMCU) having a demand monitor input coupled to the current demand output of the load, and a capacity status output of the PMCU coupled to the current-capacity input on the load, the PMCU having control outputs coupled to each of the respective voltage regulator power-activation inputs and status monitor connections coupled to each of the respective voltage regulator power output level status, and the PMCU configured to, in response to the current demand of the load, send control signals to cause the one or more voltage regulators to power up commensurate with the current demand of the load;
   wherein the third voltage regulator is configured to supply stand-by current to the PMCU and the load.

5. The power regulator as recited in claim 4, wherein the PMCU is configured to maintain a pre-determined efficiency for a given current demand of the load by powering-up or powering-down one or more voltage regulators.

6. The power regulator as recited in claim 4, wherein a source of input power supplying the power regulator is from at least one of the following: a power supply, a battery.

7. A power regulator arrangement with variable current capacity providing power to a plurality of voltage domains having variable load currents, the power regulator comprising:
   a main regulator block having one main regulator supplying a first voltage and an additional main regulator supplying an additional voltage;
   a low-power regulator block having one low power regulator supplying the first voltage and an additional low-power regulator supplying the additional voltage;
   a standby regulator block having one ultra-low power regulator supplying the first voltage and an additional ultra-low power regulator supplying the additional voltage;
   a power management control unit (PMCU), the PMCU having,
      voltage supply inputs coupled to the first voltage and to the additional voltage, thereby providing power to the PMCU;
      regulator status inputs configured to receive output voltage status signals from each of the regulator blocks,
      regulator power control outputs configured to transmit power-activation signals to each of the regulator blocks in response to the load currents of the respective the plurality of voltage domains; and
      level shift control outputs; and
   a voltage island operating at the first voltage and an additional voltage island operating at an additional voltage, the voltage island and the additional voltage island each coupled to first and second level shifters configured to facilitate data flow between the first voltage island and the additional voltage island in response to the level shift control outputs of the PMCU.

8. The power regulator arrangement as recited in claim 7, wherein a source of input power supplying the power regulator arrangement is from at least one of the following: a power supply, a battery.

9. The power regulator arrangement as recited in claim 8, wherein the battery is configured to provide input power for only the standby regulator block, thereby maintaining the power regulator arrangement in a standby mode and supplying power to a single voltage island.

10. A method for increasing the efficiency of a power regulator driving a microprocessor, the method comprising:
   provisioning a power regulator arrangement with variable current capacity providing power (VDD) from a power supply to a load having variable demand, wherein the power regulator arrangement includes:
      a first voltage regulator of a first load capacity, including input for power from the power supply (Vin), a power activation input, a power output supplying power to the load, and a power output level status monitor;
      an additional voltage regulator of a another load capacity lower than that of the first, including input for power from the power supply (Vin), a power activation input, a power output supplying power to the load, and a power output level status monitor;
      a power management control unit (PMCU) having a demand monitor input coupled to the current demand output of the load, and a capacity status output of the PMCU coupled to the current-capacity input on the load, the PMCU having respective control outputs coupled to each of the respective voltage regulator power-activation inputs and status monitor connections coupled to each of the respective voltage regulator power output level status;

measuring the power demand of the microprocessor; and responding to the microprocessor current demand by having the PMCU send control signals to the power activation input of each of the voltage regulators; and powering up one or more voltage regulators according to the current requirements of the microprocessor;

wherein a load profile of the microprocessor is known and has a first operating state and additional operating states, and the first voltage regulator and the additional voltage regulator are selected to operate at a maximum efficiency at the first operating state and additional operating states of the microprocessor.

* * * * *